(No Model.)
J. V. ROWLETT.
WHEEL.
No. 300,737. Patented June 17, 1884.
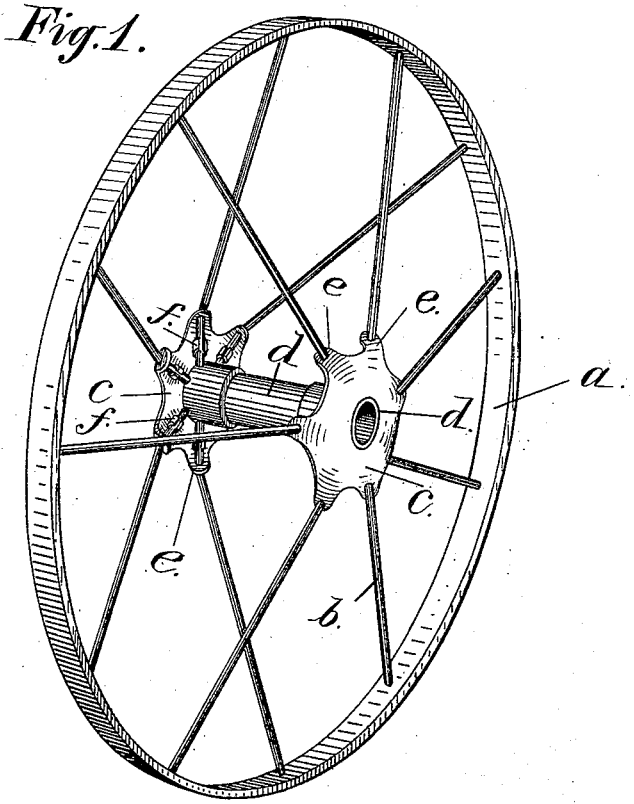
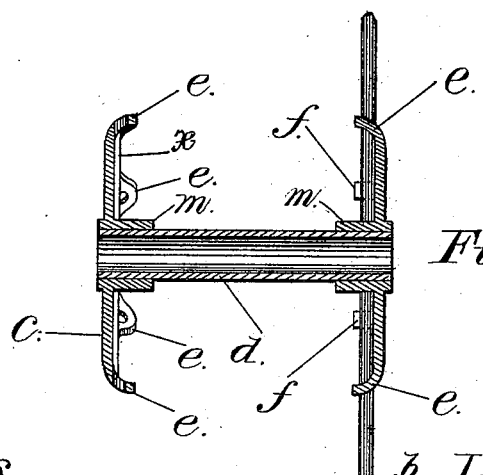
Witnesses,
Fred F Rost
Charles J Geier
Inventor.
Jacob V Rowlett
by W J Dennis
attorney

UNITED STATES PATENT OFFICE.

JACOB V. ROWLETT, OF RICHMOND, IND., ASSIGNOR TO ANNA E. ROWLETT.

WHEEL.

SPECIFICATION forming part of Letters Patent No. 300,737, dated June 17, 1884.

Application filed January 18, 1884. (No model.)

*To all whom it may concern:*

Be it known that I, JACOB V. ROWLETT, a citizen of the United States, residing at Richmond, in the county of Wayne and State of Indiana, have invented certain new and useful Improvements in Wheels; and I do hereby declare the following to be a full, clear, and exact description of the invention, such as will enable others skilled in the art to which it appertains to make and use the same.

My invention relates to that class of wheels for vehicles in which the spokes are attached to the hub on either side of the center by means of circular plates or otherwise.

The leading feature of my invention consists in a circular plate the circumference of which is provided with holes through which the spokes extend to a collar resting upon a pipe-boxing forming the hub of the wheel.

In the drawings, Figure 1 is a perspective view of my improved wheel. Fig. 2 is a longitudinal vertical section of the hub, plate, and spokes in position.

In Fig. 1, $a$ represents the rim or circumference of a wheel, and $b$ the spokes. $c$ is a concave circular plate having rounded projections or scallops $e$, the extremities of which are preferably curved inward, and which are provided with suitable holes through which the spokes $b$ $b$ are inserted. $d$ is a pipe-boxing, which forms the hub of the wheel, and the plate $c$ is provided with a collar, $m$, fitting over the pipe-boxing $d$, and serving as a rest for the ends of the spokes $b$. The plate may be cast or shrunk on, bolted, or otherwise secured to the boxing $d$. The inner surface of the plate $c$ is provided with clasps $f$, projecting inwardly, and placed on a line with the spokes and midway between the curved ends $e$ $e$ and the collar $m$. These clasps $f$ are turned or bent over the spokes and hold them rigidly within a semicircular groove or indentation, $x$, formed on the inner surface of the plate $c$. In place of these clasps, holes may be drilled in the plate-collar, in which the spokes may be set and held therein firmly by suitable means. The outer ends of the spokes $b$ are either inserted in the felly or attached to the same in any suitable manner.

I am aware that vehicles having a metallic flange cast with the hub, and provided with clips through which the spokes are passed, and by which the spokes are secured against the flange, are old; also, that split socket-pieces cast to the hub or secured to the rim for receiving the inner or outer ends of the spokes, and spoke-sockets consisting of tubes cast to the hub, are old.

Having thus described my invention, what I claim as new, and desire to secure by Letters Patent, is—

1. In a wheel for vehicles, a circular plate provided near its circumference with holes through which the spokes extend, grooves formed on the inner side of said plate, extending from said holes toward the axle to receive the spokes, and suitable clasps to hold the spokes in said grooves, substantially as described.

2. In a wheel for vehicles, in combination with the spokes, the plate provided on its circumference with the inwardly-curved projections through which the spokes are passed, the semicircular grooves formed on the inner side of the said plate to receive the spokes, and the clasps to hold the spokes in said grooves, substantially as described.

In testimony whereof I affix my signature in presence of two witnesses.

JACOB V. ROWLETT.

Witnesses:
H. A. HALL,
J. H. BLACKWOOD.